March 5, 1940.  J. E. SMITH  2,192,655

ELECTRIC HEATING UNIT

Filed April 29, 1938

INVENTOR.
JOHN ERNEST SMITH
BY
ATTORNEY.

Patented Mar. 5, 1940

2,192,655

UNITED STATES PATENT OFFICE 2,192,655

ELECTRIC HEATING UNIT

John E. Smith, Plainfield, N. J.

Application April 29, 1938, Serial No. 205,047

5 Claims. (Cl. 219—41)

This invention relates to electrical heating units and more particularly to a device of this character provided with thermostatic control, the principal object being to protect the heating element against excessive temperature rises in the heating element tending to destroy the same or impair its efficiency.

Another object is to provide a heating unit of the immersion type which may be readily installed in a heating vessel and having outside means of connection to an ordinary service plug, whereby the unit may be easily connected to or disconnected from a source of current.

Another object is to provide a construction and arrangement of the various parts of the heating unit contributing to rapid transfer of heat from the heating element, through a surrounding metallic housing, and into the contents of the vessel, thereby enabling the resistance wire of the heating element to be operated at a relatively low temperature as compared with former practice, and thereby contributing to longer life of the resistance wire and associated parts of the heating unit.

A further object is to provide a heating unit incorporating in a single housing a plurality of heating elements having different heating values, which are selectively and individually connectible to the source of current. In the present example of the invention the housing is equipped with a pair of heating elements, one for low temperature heating, and the other for a higher heating effect, either or both of the elements being in circuit with a thermostat enclosed at one end of the housing and which is set to open and close the circuit at a predetermined temperature for the purposes enumerated above. If desired, instead of having a high and a low heat element, the two elements may be of the same wattage, in which case one of the elements may be used as a reserve.

These heating units operate at considerably higher electrical capacities per square inch of heating surface than prior types, while at the same time the resistance wire itself operates at a relatively low temperature, owing to the rapid transfer of heat from the wire and into the medium to be heated.

Figure 5:
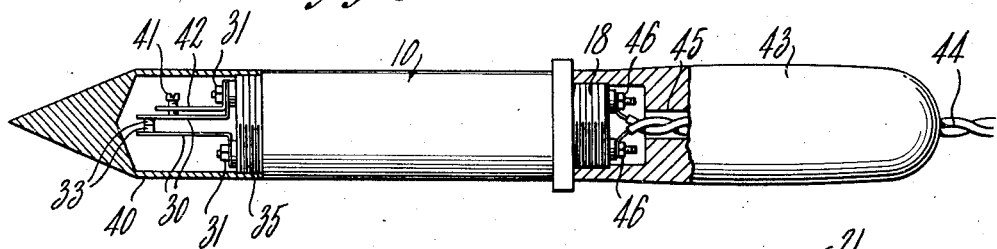
Figure 1:
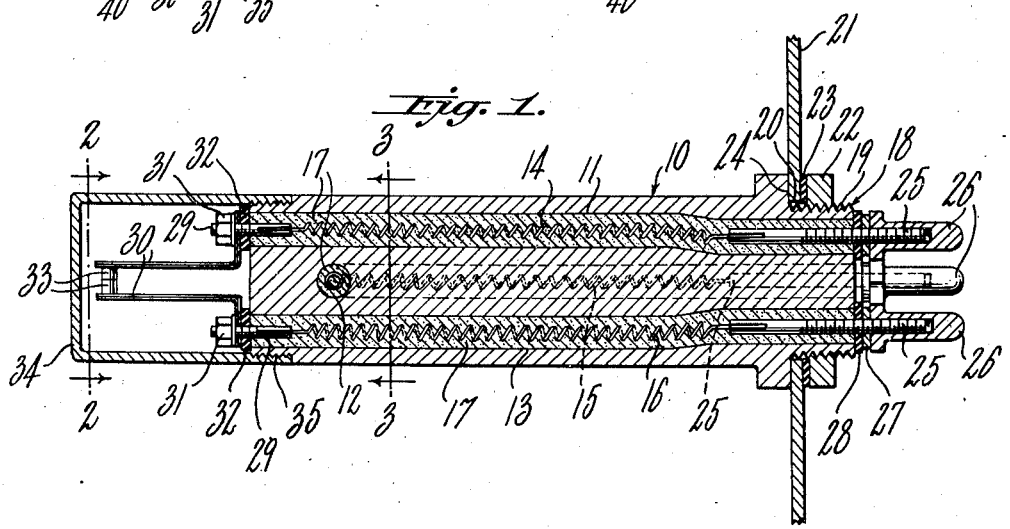
Figure 2:
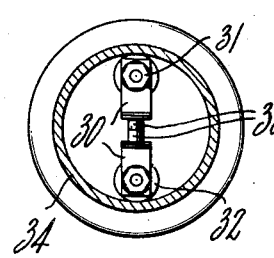
Figure 3:
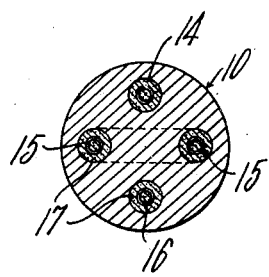
Figure 4:
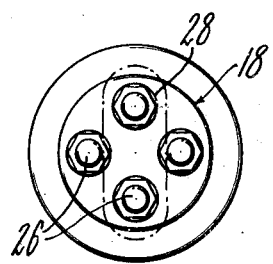

Various other objects and advantages of the invention will become apparent as the description proceeds, reference being made to the accompanying drawing forming a part of this specification, and in which:

Fig. 1 is a longitudinal section of a heating unit incorporating my invention, shown installed in the wall of a heating vessel, Fig. 2 is a transverse section on the line 2—2 of Fig. 1 showing the thermostat in end view, Fig. 3 a transverse section on the line 3—3 of Fig. 1 showing an arrangement of the heating elements in a metallic housing, Fig. 4 an end view of the terminal portion of the unit, and Fig. 5 a transverse sectional view illustrating a modification of the invention as embodied in a soldering iron or the like.

Referring at first to Fig. 1 of the drawing the numeral 10 indicates a housing of metal possessing high thermal conductivity, such as aluminum, and having internal bores or openings 11, 12 and 13 for heating elements comprising resistance wires 14, 15 and 16 embedded in heat-resisting insulating material 17 usually a ceramic substance of the kind generally employed for this purpose. For convenience in mounting, the housing 10 is provided with a reduced end 18 threaded at 19 and adapted to extend through an opening 20 in the wall 21 of a heating vessel or the like, whereby the other end of the heating unit is positioned within the interior of the vessel and immersed in the contents to be heated. A nut 22 is tightened against a washer 23 to draw a shoulder 24 of the housing, and the washer 23 into fluid tight engagement against the inner and outer surfaces of the wall 21 around the opening 20.

The terminal ends of the heating elements 14, 15, and 16 are individually connected to threaded studs 25 embedded in the insulating material 17. Terminal pins 26 are screwed onto the studs 25 against washers 27 and insulating pieces 28 whereby the pins 26 are rigidly held in place at the outer end of the housing 10, providing means for making electrical connections to the service current through a suitable connection plug as will be more fully described later. In the present example of the invention the heating element 15 has its ends connected directly to a pair of the oppositely disposed studs 25, whereas the heating elements 14 and 16 each have a terminal connection to an individual threaded stud 29 likewise embedded in the insulating material 17 at the opposite or left end of the housing 10 as viewed in Figure 1.

The studs 29 support strip members 30 at least one of which is of thermo-metal or bi-metallic strip material. The members 30 are secured to the studs 29 by nuts 31, there being insulating washers 32 interposed between the strips members 30 and the end of the housing 10. Contacts 33 are provided at the free ends of the members 30. A cap or cover 34 is threaded onto the end of the housing at 35 and serves to protect the enclosed members 30 which constitute a thermostatic or heat controlled switch for the heating elements 14 and 16 the thermostat being designed to open the normally closed circuit through these elements upon a predetermined rise in temperature, thereby saving the heating wires 14 and 16 from destruction. The heating wires 14 and 16 constitute one heating element having an interposed switch.

By a slight alteration in construction it is apparent that a similar thermostat may be provided in the circuit of the heating element 15, or by suitable alterations and electrical connections the same thermostat serves for both elements. Only one thermostatic control has been shown herein for the purpose of illustrating the application of this form of control for a heating unit of the character described. Furthermore, the thermostat construction may be modified in conformity with the particular requirements of installation.

In operating the above described appliance, a service plug is attached to a pair of the oppositely disposed terminal pins 26 corresponding to the heating element 15, or to the other pair corresponding to the circuit comprised by the heating elements 14 and 16, there being sufficient clearance to permit the plug to enter between the terminal pins of the opposite pairs which are disposed at right-angles to each other. Thus it is possible to energize either one of the heating circuits independently of the other. It is of course also possible to connect feed wires directly to the threaded studs 25 in lieu of the plug connection by substituting nuts for the terminal pins 26, and furthermore, the two circuits may then be controlled by any suitable switching means in the external feeding circuit.

Heat generated in either of the heating elements is quickly transferred through the metal of the housing by reason of its high thermal conductivity, and thence into the medium to be heated within the vessel. Preferably the housing is cast around the insulating material of the embedded heating elements. This is a further contributing cause of rapid heat transfer, since the compression against the insulating material resulting from the shrinking of the cast metal brings the parts surrounding the heating elements into close contact under compression.

Figure 5 illustrates an embodiment of the invention in a tool such as a soldering iron. In this application the cap shown in Figure 1 is removed from the housing 10 and a soldering tip 40 substituted therefor by threading on at 35. The strip members 30 are mounted in the same manner as those described in Figure 1, with the upper strip as viewed in Figure 5 is adapted to be adjusted toward or away from the lower or bi-metallic strip by means of an adjusting screw 41 mounted in a support 42 held rigidly in place beneath the nut 31, so that the switch may be set for any desired temperature within its working range.

A handle 43 is threaded onto the reduced end 18 of the housing 10, and flexible wire 44 is passed through an opening 45 and secured to the studs 25 by nuts 46. Obviously, only the two sections of heating elements 14 and 16 are needed in the soldering iron, and it is possible to set the adjusting screw 41 to open the circuit at any predetermined temperature either for the purpose of protecting the heating element or to set the cut off temperature for the soldering tip.

Various other modifications may be made without departing from the spirit of the appended claims.

I claim:

1. An electrical heating unit, comprising an elongated metal housing of high thermal conductivity adapted to be immersed in a medium to be heated, heating elements embedded in insulating material in said housing, the latter being cast around the insulating material to obtain close contact of the metal and the insulation under compression due to shrinkage of the metal in the process of casting, a heat operated switch at one end of the housing and in circuit to control a heating element, and exposed terminal connections at the other end of the housing for making electrical connections for energizing the heating elements.

2. An electrical heating unit comprising heating elements embedded in insulating material and a metallic housing cast therearound so as to completely encase the heating elements and the surrounding insulation under compression, a thermostat controlled switch external to said housing and in circuit to control a heating element, and a cap enclosing said switch and carried by said housing.

3. An electrical heating unit of the immersion type comprising heating elements embedded in insulating material and entirely enclosed by a metal housing which has been cast therearound, said housing being characterized by an elongated body adapted to extend into the interior of a heating vessel, means for holding said housing rigidly and in fluid tight relation in the wall of said vessel with one end of the housing projecting to the outside of the vessel, terminal means on the outside end of the housing and connected to the heating elements, a heat controlled switch at the interior end of the housing and in circuit with a heating element, and a cover enclosing the switch from the contents of the vessel.

4. An electrical heating unit comprising heating elements embedded in insulating material in a metallic housing of high thermal conductivity cast around the heating elements so as to hold the same in intimate contact with the metal under compression, threaded studs connected to said heating elements and embedded in said insulating material at one end of the housing, said studs extending beyond the exterior thereof of the housing, means for making electrical connections to said studs whereby to energize the heating elements, and a heat controlled switch interposed in the circuit of a heating element and mounted on said housing.

5. An electrical heating unit comprising a heating element embedded in insulating material and entirely enclosed by a metal housing which has been cast therearound, said housing being characterized by an elongated body, means thereon for the mounting of said housing, exposed terminal connections on the mounted end of said housing and connected to said heating element, a thermostatic switch connected to said element and mounted adjacent the opposite end of said housing, and a cover enclosing said switch.

JOHN E. SMITH.